UNITED STATES PATENT OFFICE.

ROGER PIOGEY, OF PARIS, FRANCE, ASSIGNOR TO PIOGEY & CIE., OF PARIS, FRANCE, A CORPORATION OF FRANCE.

PROCESS OF MANUFACTURE OF A PLASTIC NON-INFLAMMABLE AND ODORLESS MATERIAL.

1,263,284.          Specification of Letters Patent.     Patented Apr. 16, 1918.

No Drawing.     Application filed February 9, 1917. Serial No. 147,662.

*To all whom it may concern:*

Be it known that I, ROGER PIOGEY, engineer, of 87 Rue d'Amsterdam at Paris, Department of the Seine, France, citizen of the French Republic, have invented certain new and useful Improvements in Processes of Manufacture of a Plastic Non-Inflammable and Odorless Material; and I do hereby declare the following to be a full, clear, and exact description of the invention, such as will enable others skilled in the art to which it appertains to make and use the same.

The present invention relates to a plastic noninflammable and odorless material capable of imitating according to its color, tortoise shell, horn, amber, ivory, or other analogous substances.

This plastic material is obtained by transforming gelatins, glues and the like of animal origin, by suitable chemical reagents, giving them plastic and malleable properties which allow them to be worked and used industrially in a similar manner to the natural products.

The gelatins or glues of animal origin are first melted in a water bath at a temperature of about 90° C. A decoction of hop flowers is then prepared which is mixed with dilute oxalic acid or any other acid of the di-carboxylic series of the general formula $C_nH_{2n-2}O_4$ and this solution is added to the melted gelatins or glues in varying proportions according to the quality of the materials employed.

The oxalic acid is for the purpose of rendering the material in the bath plastic and this acid is chosen because of the fact that it is mild in its action and will not cause the cracking of the material, such as will be caused by a stronger acid.

The addition of this solution has the effect of rendering the gelatins more supple and of causing the impurities which they contain to be deposited at the bottom of the vessel. When the gelatins are liquefied, they are poured out in the form of sheets or sticks of the desired thickness, which are then put to dry in cold air. The coloring of the materials is then proceeded with, employing natural or artificial colors, anilin dyes or solutions prepared previously. These colors will be mixed with the materials in more or less large quantity according as it is desired to obtain a uniform tint, or streaks, or spots of any form and direction. Several different colors may likewise be employed.

The sheets thus colored, are plunged into a bath of approximately the following composition:

About 25% to 35% of formaldehyde.
" 25% to 35% of water.
" 25% to 35% of alcohol.

And the rest composed of a mixture of oxalic acid, tannin and glycerin.

As above, the oxalic acid in this bath may be replaced by any other acid of the dicarboxylic series of the general formula, $C_nH_{2n-2}O_4$. The time of immersion of the plates in this bath depends upon their thickness the liquid having to penetrate into the entire plastic mass by imbibition.

The composition of the bath given above is suitable for gelatins of nominal quality, in the case of rich gelatins, or gelatins of greater viscosity, the proportion of alcohol must be augmented.

The sheets when taken out of the bath are dried, preferably in hot air. After very complete drying, a very plastic, very malleable material is obtained which can be worked in a similar manner to horn and tortoise shell and which has the same industrial applications as these natural products. This substance when suitably worked may serve for the manufacture of combs, buttons, brushes, fancy turnery, etc., as an imitation of tortoise shell, horn, amber and ivory. Contrary to the products resulting from the treatment of the cellulose employed now in commerce, as artificial products, the plastic material according to this invention is absolutely noninflammable and odorless.

I claim:

Process of manufacture of a plastic noninflammable and odorless material, consisting in treating melted gelatins with a solution composed of a decoction of hops and dilute oxalic acid or any other acid of the dicarboxylic series of the general formula $C_nH_{2n-2}O_4$, in then plunging the gelatins after having dried and colored them into a bath containing formaldehyde, water, alcohol, oxalic acid or any other acid of the di-carboxylic series ($C_nH_{2n-2}O_4$) tannin and glycerin substantially as described.

In testimony whereof I affix my signature, in presence of two witnesses.

ROGER PIOGEY.

Witnesses:
  HENRY COHEN,
  CHAS. P. PRESSLY.